Nov. 13, 1951  G. DEARSLEY  2,574,628
APPARATUS FOR SUPPLYING CIGARETTES TO PACKING MACHINES
Filed April 30, 1948  10 Sheets-Sheet 1
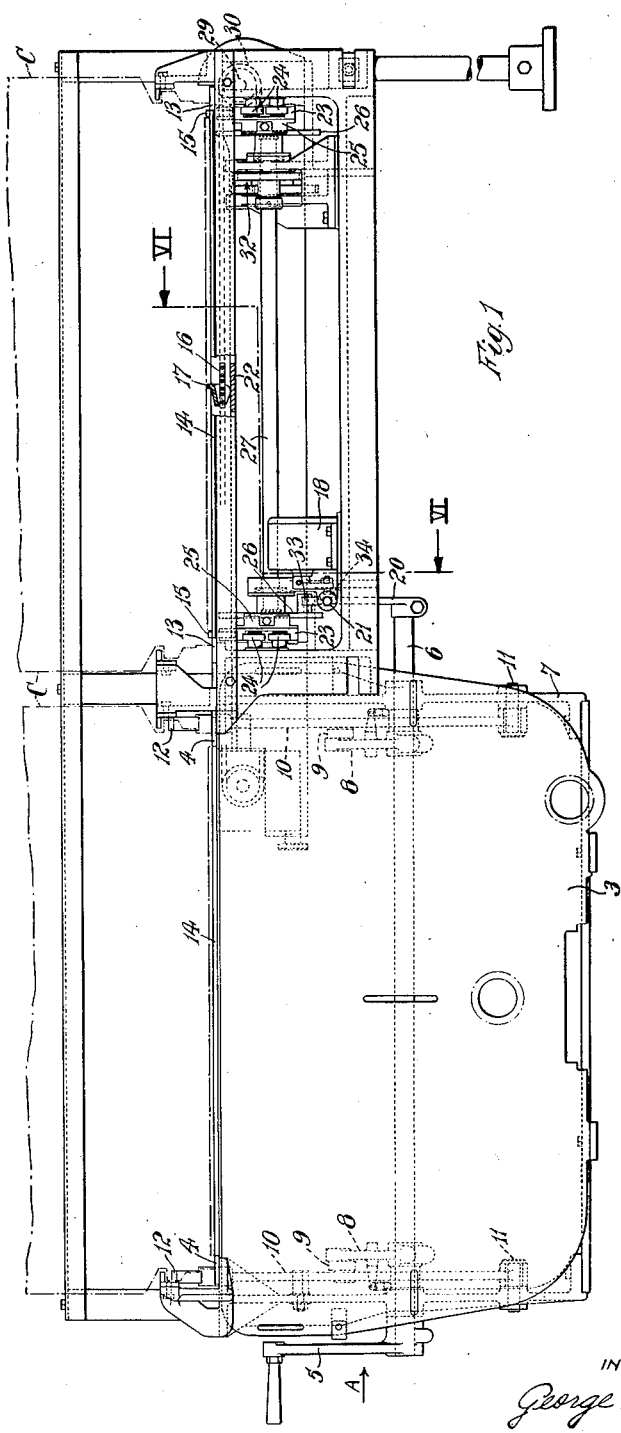
INVENTOR
George Dearsley
By: Watson, Cole, Grindle & Watson
Attys.

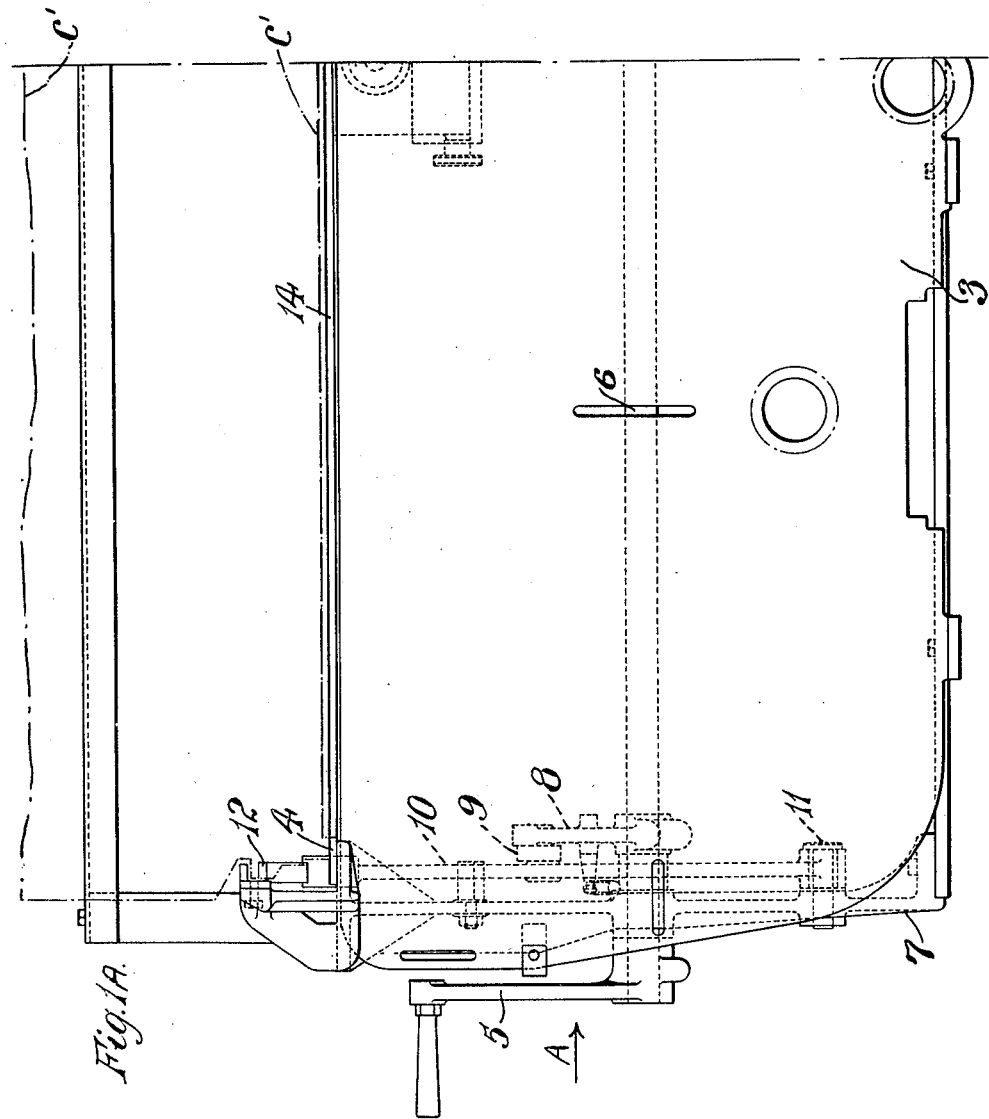

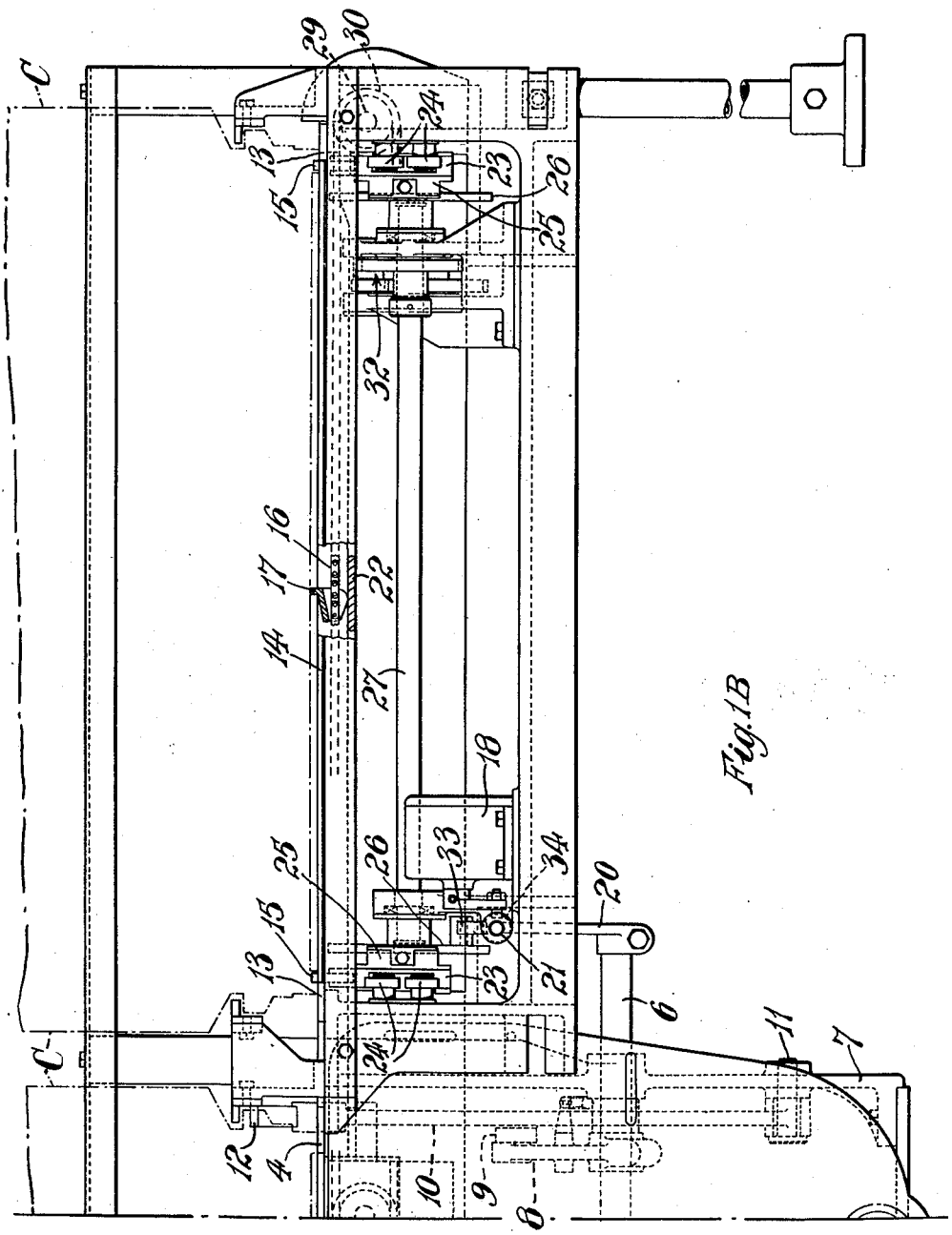

Nov. 13, 1951   G. DEARSLEY   2,574,628
APPARATUS FOR SUPPLYING CIGARETTES TO PACKING MACHINES
Filed April 30, 1948   10 Sheets-Sheet 4
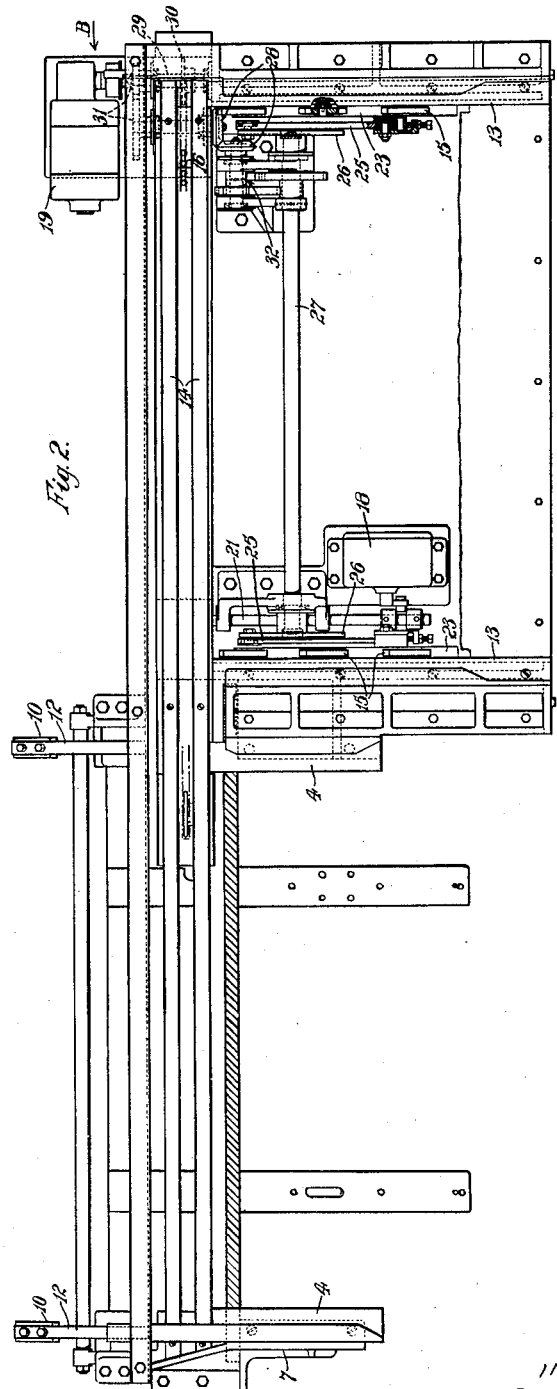

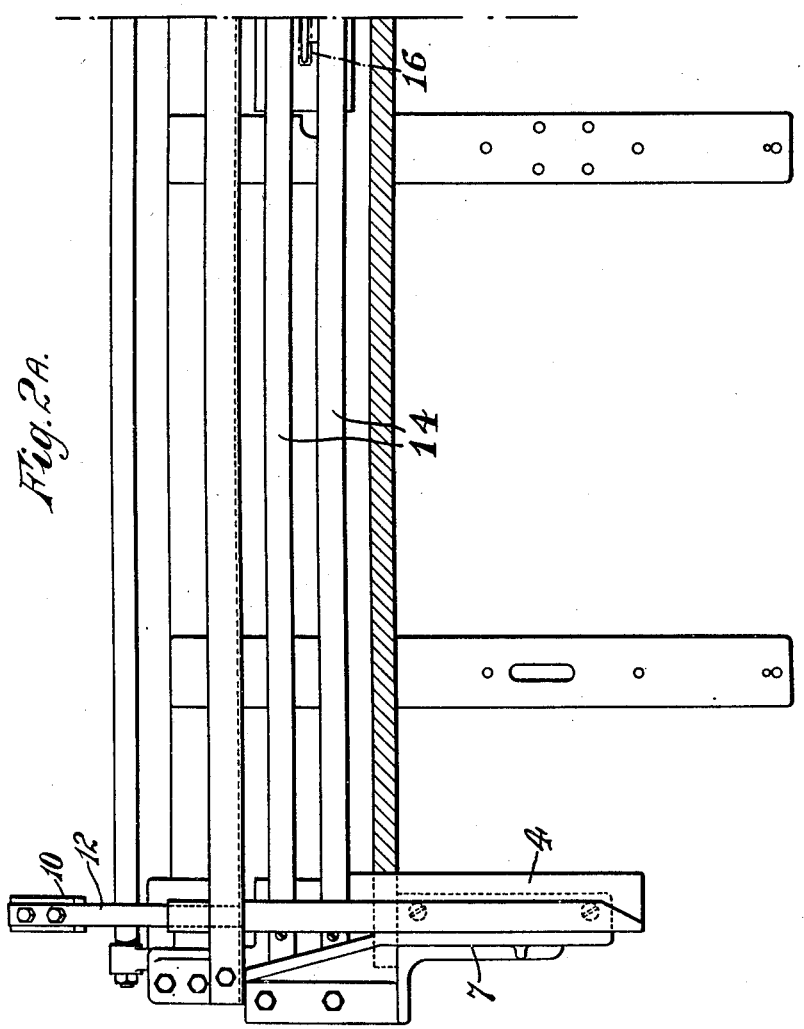

Nov. 13, 1951            G. DEARSLEY            2,574,628
APPARATUS FOR SUPPLYING CIGARETTES TO PACKING MACHINES
Filed April 30, 1948            10 Sheets-Sheet 6
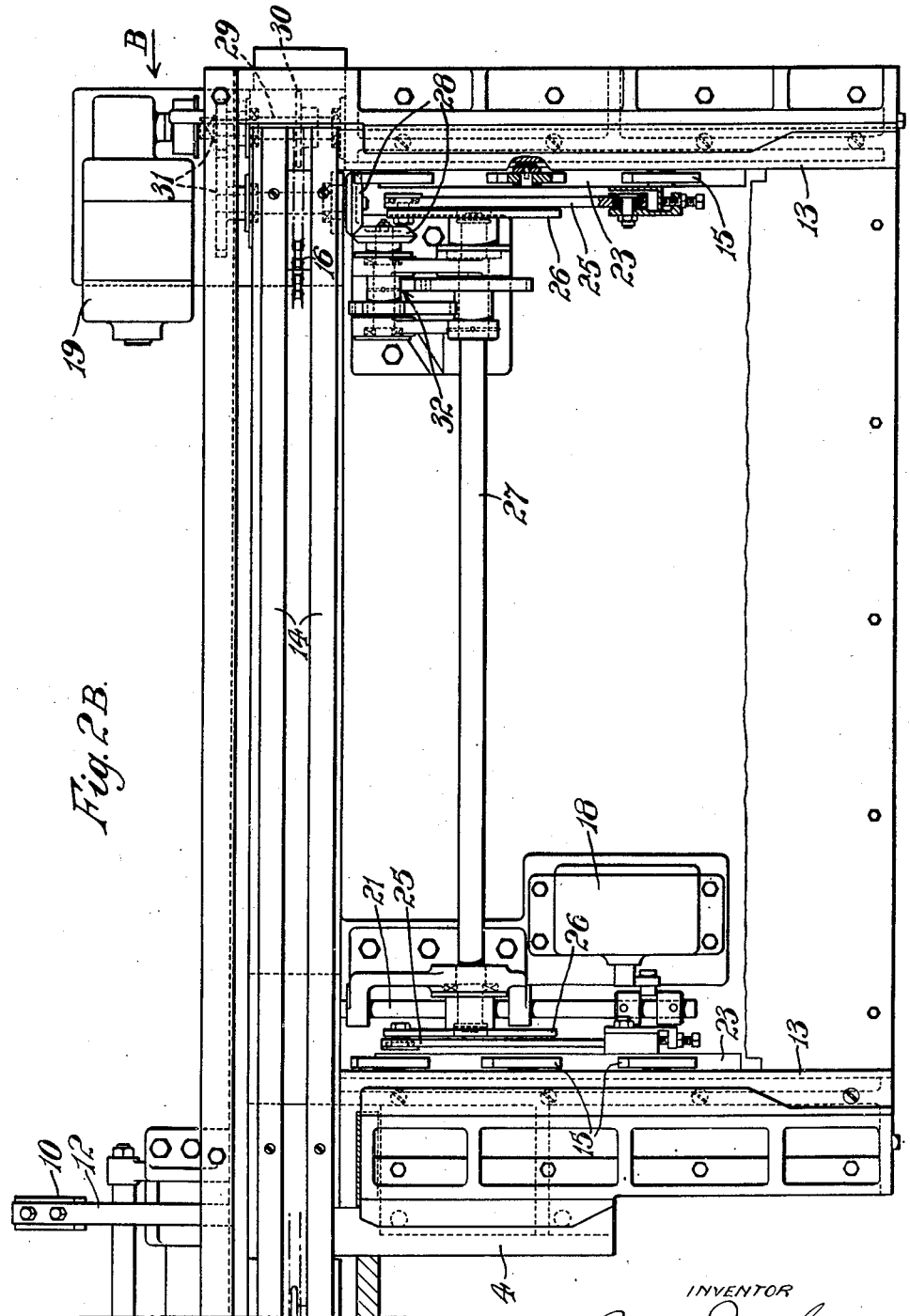
INVENTOR
George Dearsley
By: Watson, Cole, Grindle & Watson
Attys.

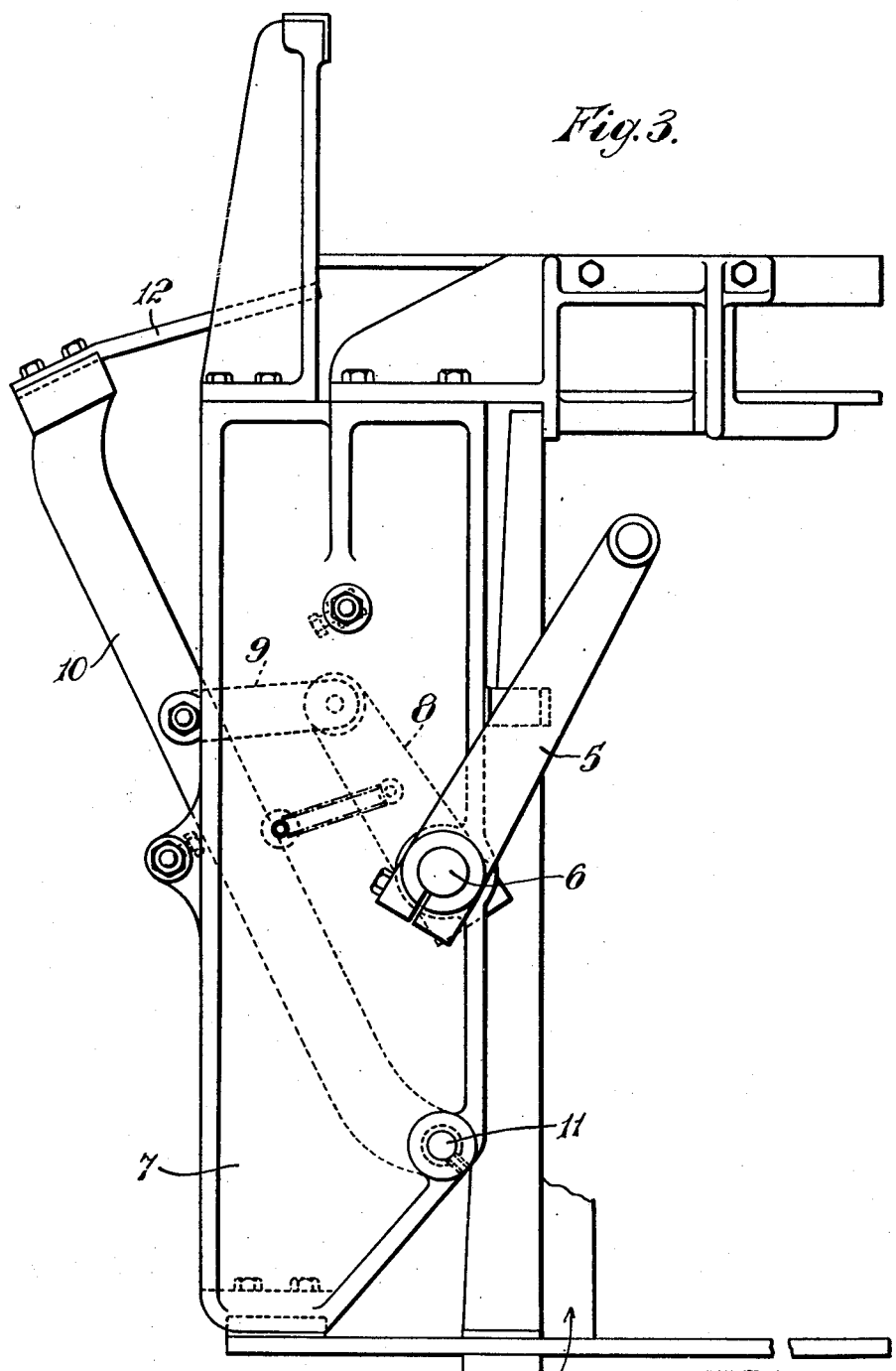

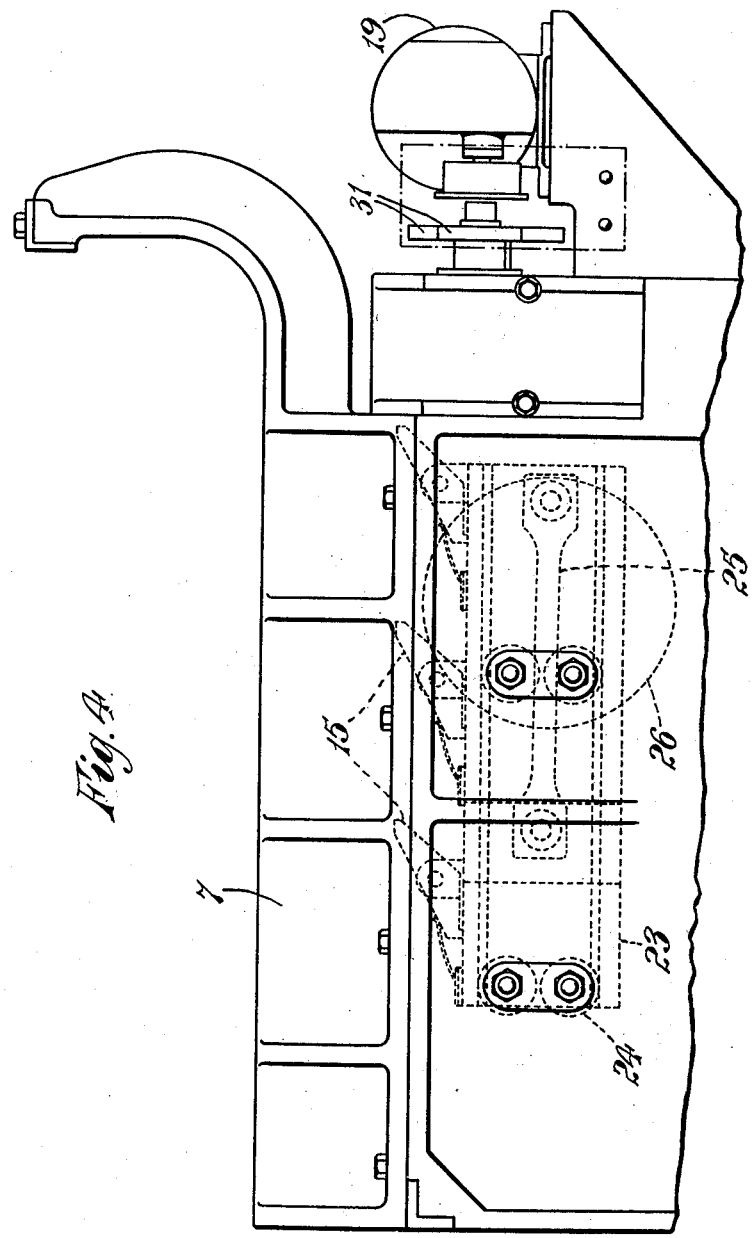

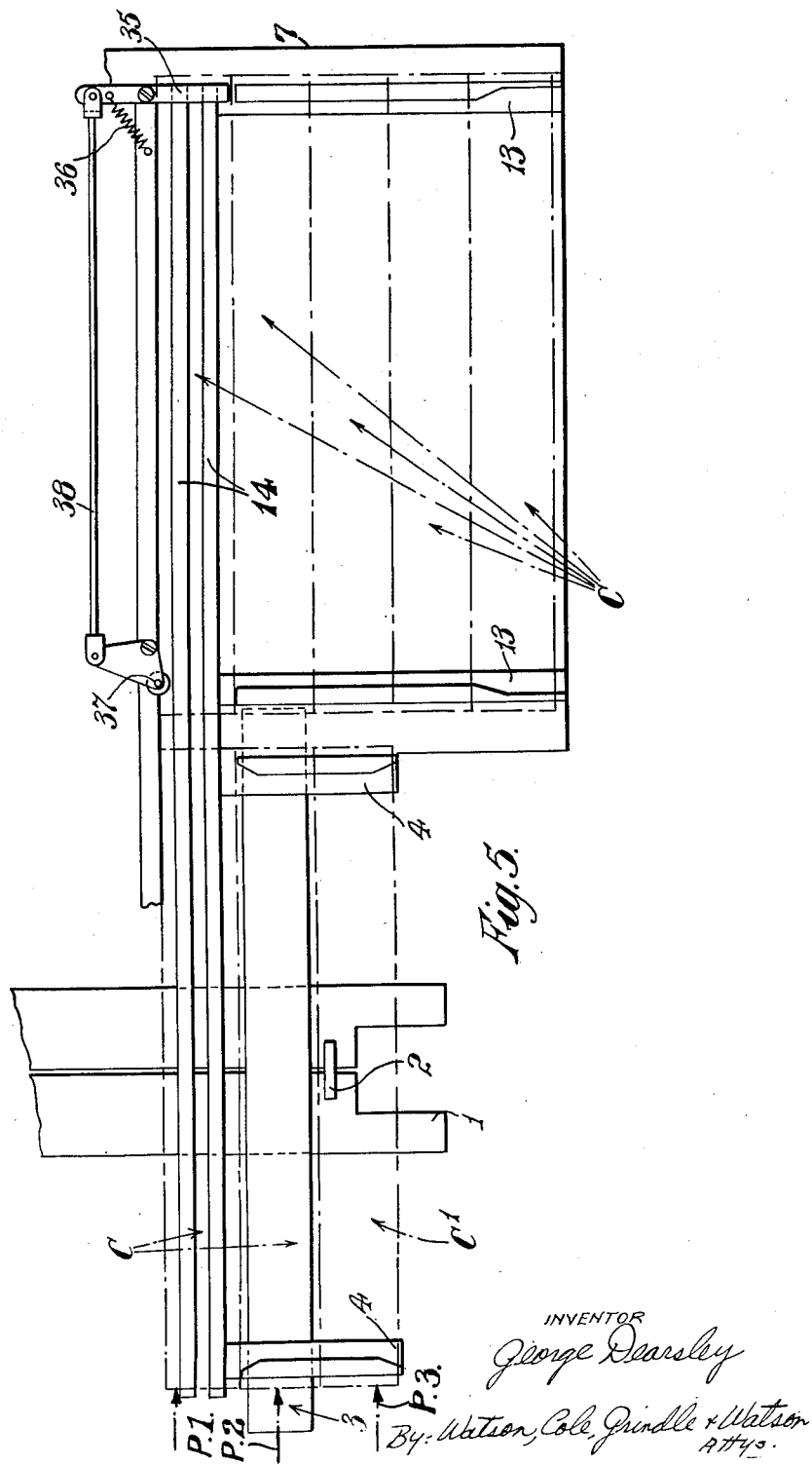

Nov. 13, 1951   G. DEARSLEY   2,574,628
APPARATUS FOR SUPPLYING CIGARETTES TO PACKING MACHINES
Filed April 30, 1948   10 Sheets-Sheet 10

George Dearsley
INVENTOR

Watson, Cott, Grindle & Watson
Attorneys

Patented Nov. 13, 1951

2,574,628

UNITED STATES PATENT OFFICE 2,574,628

APPARATUS FOR SUPPLYING CIGARETTES TO PACKING MACHINES

George Dearsley, Scarsdale, N. Y., assignor to Molins Machine Company Limited, London, England, a British company Application April 30, 1948, Serial No. 24,398
In Great Britain May 6, 1947

3 Claims. (Cl. 198—19)

This invention concerns apparatus for supplying articles (e. g. cigarettes or filter plugs) to a hopper.

When articles are being fed from a hopper it is often desirable to convey them to the hopper in containers, from which they are discharged into the hopper. For example in packing cigarettes at high speeds it is desirable to deliver the cigarettes from a cigarette-making machine to the packing machine in containers which are automatically filled on the cigarette-making machine. Again, when cigarettes and filter plugs are being assembled to make mouthpiece cigarettes, for example on the machine described in United States Patent No. 2,156,600, in which cigarettes and plugs respectively are fed from hoppers on the machine, these cigarettes and plugs may be conveyed to the machine in similar containers from which they are discharged into their respective hoppers. The invention concerns an apparatus for mechanically handling these containers and delivering their contents into a hopper as required. For convenience the word "articles" when used herein shall be taken to mean cigarettes, filter plugs, or other rod-like articles, and it is to be understood that the hoppers referred to herein are hoppers which are intended to hold such articles arranged so as to be similarly oriented, and that the articles are likewise similarly oriented when in the containers referred to.

The apparatus constructed according to the invention is so designed that the time necessary for removing an empty container from the discharging position and replacing it by a full container is reduced to a minimum. This is effected by arranging the apparatus so that an empty container has only to move a distance equal to its thickness from the discharging position to permit a full container to replace it, the full container moving simultaneously with the empty container.

The containers are provided with removable bottom plates and it only requires a very few seconds for the operator to transfer the containers and remove the bottom plate from the full container as the latter arrives at the discharging position.

If any delay occurs in the transfer of the containers, the hopper becomes partly empty, and in this case the cigarettes from the container have to fall so far that they are liable to become disarranged, thus necessitating a stoppage of the machine to enable the operator to straighten the cigarettes again. Apparatus of this kind in relation to a packing machine has been described in British patent specification No. 383,382 but the apparatus illustrated supports a large number of containers directly above the machine bed and this arrangement is inconvenient and hinders the observation of the mechanism of the machine.

In the construction described therein there is provided an apparatus for feeding and supplying articles to a machine hopper comprising a track adapted to support a number of containers above the level of the machine hopper and located laterally away from the machine (e. g. alongside) a track leading from the first said track to a further track located directly above the machine and means for moving containers from the first track across the second track to the third track. The first track may be arranged parallel to the bed of the machine as illustrated herein though the precise arrangement depends on the design of the machine, and the second track arranged at right angles to the first. The third track is parallel to the first and is preferably short so that only two or three containers are supported by it. Movement of containers along the third track may be effected manually (e. g. by a lever) while movements along the other tracks may be effected by power, for example by motor driven conveyors. Automatically operated switches may control the movements of the motors or in a purely mechanical drive, clutches may be used.

The invention will be more fully described with reference to the accompanying drawings which show its application to a well known type of packing machine.

In the drawings:

Figure 1 is a front elevation of the apparatus showing its position with respect to the hopper of a cigarette-packing machine.

Figures 1A and 1B together form a view which is identical in all respects with Figure 1 except that the parts are drawn to a larger scale.

Figure 2 is a plan of Figure 1.

Figures 2A and 2B together form a view which is identical in all respects with Figure 2 except that the parts are drawn to a larger scale.

Figure 3 is an end elevation of Figure 1 looking in the direction of the arrow A.

Figure 4 is an end elevation of part of Figure 2 looking in the direction of the arrow B.

Figure 5 is a diagrammatic plan showing the location of the apparatus with respect to a packing machine.

Figure 6:
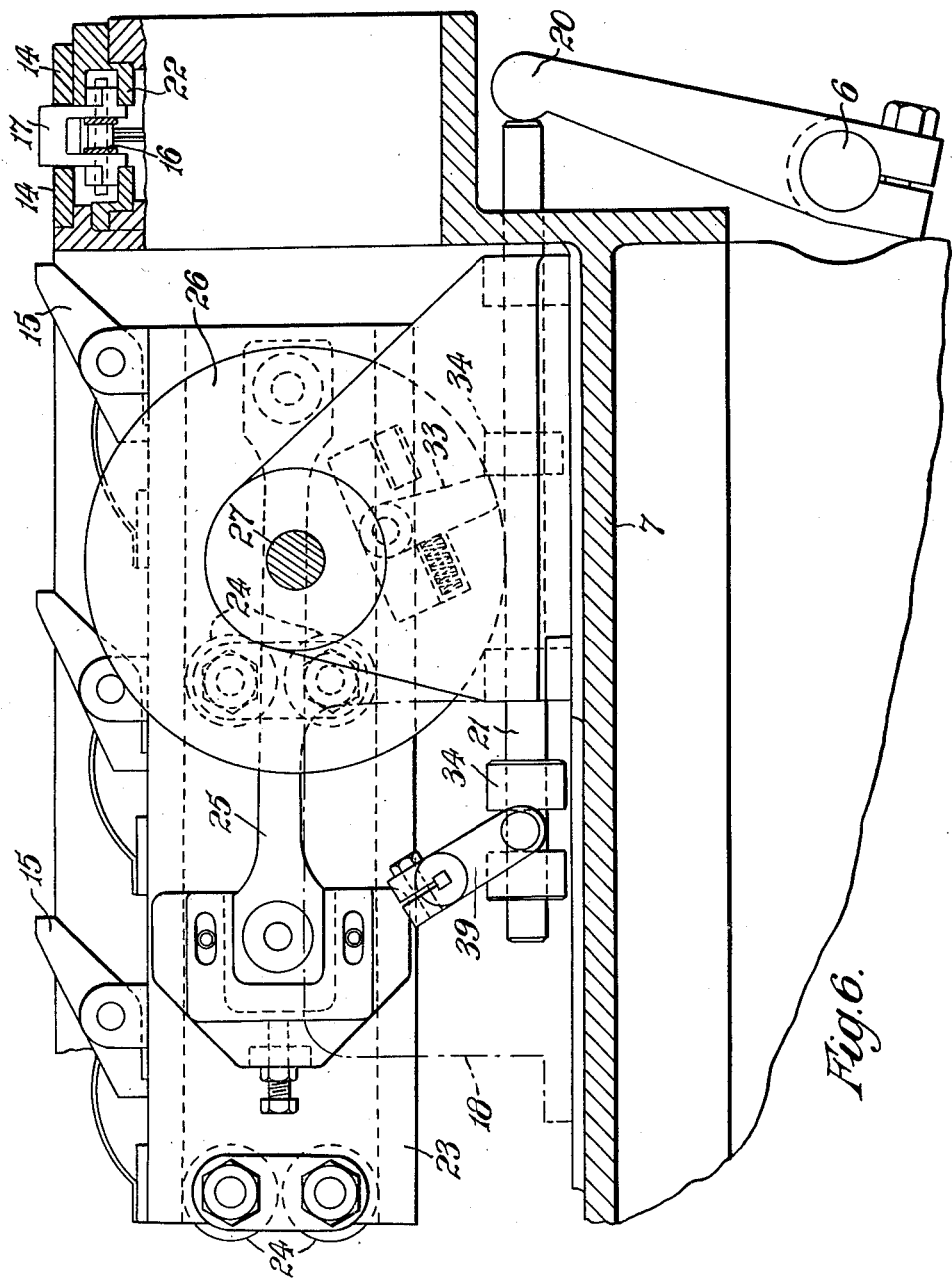
Figure 6 is a section of part of Figure 1 on the line VI—VI.

Referring first to Figure 5 the packing machine comprises a bed 1 along which pushers 2 mounted on an endless conveyor (not shown) move and receive cigarettes from a hopper 3 supported above the bed. The hopper 3 as viewed from above is in the shape of a long rectangular box and extends transversely of the bed and as seen in Figure 5 it is disposed near one end of the bed.

In Figure 5 there are also shown a number of cigarette containers of rectangular plan drawn in broken lines. Those marked C are full of cigarettes, while one marked $C^1$ is empty. The containers are also partly indicated by broken lines in Figures 1, 1A and 1B.

Referring also to Figures 1 to 4 a pair of guide rails 4 constituting a track, called herein the third track, are mounted some distance above the bed of the packing machine directly over it and parallel thereto and suitably arranged so that a full container C Figure 5 positioned at P.1 on rails 14 may be moved a distance substantially equal to its thickness to position P.2 on the rails 4 whereupon it stands vertically above the hopper 3 of the packing machine, into which its contents may be discharged.

The movement is effected by a suitable hand operated lever 5 (Figures 1, 1A and 3) fixed to a shaft 6 journalled in the frame 7 of the apparatus. Levers 8 are fixed to the shaft and are connected by links 9 to levers 10 pivoted at 11 to the frame 7. The upper ends of the levers 10 have pushplates 12 fixed to them which engage and move the container. The movement, see Figure 5, of a full container into the discharging position causes another (empty) container to move from the discharging position to a removal position P.3 where it is marked $C^1$. This second container $C^1$ is empty, having previously discharged its contents into the packing machine hopper and its movement is effected by the movement of the first container from P.1 to P.2 which merely pushes it along the rails 4 away from the discharging position. The removal position is between the hopper and the neighbouring end of the bed of the packing machine where normally an attendant stands whose duty it is to fill the hopper and level the cigarettes in it before emptying a fresh container into it. In the present case the attendant is further required to feed forward a fresh full container at the appropriate time as determined by the quantity of cigarettes in the hopper, remove the bottom plate of the container to allow the cigarettes to discharge into the hopper and place the bottom plate in the preceding empty container and to dispose of the latter.

The position P.1 occupied by the first container prior to the movements described above is immediately occupied by another full container which is moved into position in the following manner.

Another pair of guide rails 13 are disposed parallel to the pair 4 but displaced laterally therefrom and occupy a position parallel to the machine bed but far enough removed therefrom to permit easy access thereto by the machine operator and easy observation of the mechanism. This pair of rails 13 which constitutes a track called herein the first track are at the same level as the pair 4 and transverse rails 14 previously referred to, connect one end of the pair 13 with that end of the pair 4 onto which the first said full container is moved. The transverse rails 14 constitute another track called herein the second track.

The transverse rails 4 are much narrower than the others since containers move endwise when making the transverse movement from the first track to the third track whereas they move in directions normal to their broad sides on the other rails 4 and 13.

The pair of rails 13 extend from the junction with the transverse rails 14 to any suitable distance, the length depending on the location of the machine and the factory layout since the function of the first track constituted by the pair 13 is to provide a continuous supply of full containers for the machine. By way of example it will be assumed that, as shown, the rails 13 are long enough to hold four containers with narrow spaces (not shown) between them. A conveyor, for example an endless belt or as shown a series of pawls 15 (Figures 2, 2B, 4 and 6) is arranged to move containers along the pair of rails 13 towards the transverse rails 14 and another conveyor which may be an endless chain 16 having one or more pushers 17 (Figures 1 and 1A) on it is arranged to move containers along the rails 14 from the end of the pair of rails 13 across to the end of the pair 4. The conveyors are preferably mechanically driven, for instance by electric motors.

The operation of the apparatus is as follows:

The cigarette hopper is filled and levelled and a full container is placed at P.2 on the first track, that is, the pair of rails 4 above the hopper and the bottom plate removed. Another full container is placed on the second track, that is on the rails 14 at position P.1. The third track formed by the pair of rails 13 has four full containers placed on it and ahead of these is a fifth container, supported on the right hand side of the second track or rails 14 so that all the tracks are full to capacity. When all the cigarettes from the full container P.2 have fallen into the hopper the attendant pulls the lever 5. This causes the succeeding container P.1 to move from the rails 14 on to the rails 4 and into the discharging position P.2 and push the empty one farther along the rails 4 to the removal position P.3. The attendant takes the empty one off the rails 4 and puts it on a hook of the factory conveyor system or disposes of it in any similar way. In normal continuous running the attendant puts the plate removed from one container into the preceding one, the plate from the first container of a day's run being put aside.

The action of pulling the lever 5 closes a switch 18 at the end of the movement as described in the next sentence and a motor 19 driving the transverse conveyor 16 is started. The shaft 6 has a further arm 20 on it which engages a push rod 21 and moves a lever 39 to operate the switch to start the motor when the lever 5 is pulled. Thus unless the lever 5 is moved its full stroke the switch 18 does not close so no movement of the mechanically fed containers can take place unless a container has been manually moved to the discharging position.

The pusher 17 rides on a rail 22 which keeps the pusher upright so that as soon as the rail finishes the pusher drops and ceases to move the container. The pusher is not shown in its correct position which should be against the left hand container but is shown where it can be seen more easily. The section line VI—VI in Figure 1 is drawn to include the pusher in the sectional view Figure 6. Thus the right hand container on the pair of rails 14 is moved across to the position P.1 in line with the pair of rails 4. The motor is stopped by tripping the above-mentioned switch 18 when the movement is completed as will now be explained.

As previously stated the containers are moved along the first track formed by the rails 13 by pawls 15. These are pivoted in slides 23 supported on rollers 24 and reciprocated by connecting rods 25. The rods are pivoted to crank discs 26 and these are fixed on a shaft 27 which is driven through compound reduction gearing at 32 by bevel gear wheels 28 from a shaft 29 on which a sprocket wheel 30 of the conveyor 16 is fixed. The shaft 29 is geared to the motor by gear wheels 31. When the motor is started by the switch 18 and the pusher 17 carries a container from the right hand end of rails 14 to the left the pawls 15 move forward to move the containers on the rails 13 a stage forward and take a further container into the vacant position on rails 14 caused by the movement of the preceding container to the left and when the movement is finished a pawl or lug 33 on the left-hand, Figure 6, crank disc 26 engages a collar 34 on the push rod 21 and the switch is operated to stop the motor. Further full containers may be added to those on the rails 13 as and when necessary.

If the general layout of the apparatus is such that the above arrangement will not suit, the conveyor 16 and pawls 15 may be driven by separate motors and when the switch 18 is tripped to stop the motor 19 a further switch is closed whereby another motor is started to drive the pawls or endless belt or other device for moving containers on the rails 13 and move the remaining containers on said rails a stage forward so that the leading container moves into line with the transverse rails. The motor is stopped when the movement is completed, by any suitable switch. A further container may be placed on the second pair of rails to make up the deficiency and the manner of doing this depends on the factory layout. Thus if the first track is long enough, several fresh containers may be added at comparatively long intervals.

The whole of the movements above described take place while the container above the hopper is being emptied and are thus very slow which allows the use of a very low powered motor.

The operation of the whole system is prevented unless a container is properly positioned above the hopper for example by electrically interlocking the hand lever with the conveyor mechanism as above described.

A stop device shown only in Figure 5 is fitted where containers pass from rails 13 to rails 14 so that a container cannot move across until there is room on the rails 14 to receive it. The stop consists of a pivoted lever 35, Figure 5, which is pulled by a spring 36 into the position shown in which case a container can pass. The movement cannot take place unless a pivoted detector 37 which is connected to the stop lever by a rod 38 is as shown on the drawing. As a container moves from the right hand position on the rails 14 towards its left hand position it presses the detector and causes the stop lever to rotate clockwise sufficiently far to present a stop in the path of the containers on the rails 13. With this device an operator cannot move a container partly on to the rails 14 before there is proper room for it and thus the leading container on the rails 13 cannot be pushed askew on to rails 13. The operator can therefore add containers to rails 13 without having to exercise any special care.

With any suitable known detecting device engaging the cigarettes in the machine hopper the whole of the operations above described could be effected automatically and the attendant's only duty would be to see that sufficient containers were always present on the first track. However it is usual for the attendant to inspect the cigarettes while filling the hopper and probably semi-manual operation is preferable.

The system described enables the attendant to remove empty containers and provide fresh ones while standing in one position, in addition to the normal duties previously described, for the attendant is facing both the removal and supply positions and can cover the whole of the duties without undue effort. The physical effort required to replenish the hopper is limited to the effort required to move one full and one empty container only. On existing systems the attendant has to move all the full containers each time more cigarettes are required in the hopper.

What I claim as my invention and desire to secure by Letters Patent is:

1. Apparatus for feeding and supplying articles to a machine hopper, comprising a track system adapted to support containers filled with said articles above the level of the machine hopper, a track of said system being arranged to support a number of filled containers away from the machine, a second track leading from the delivery end of the first track toward the machine and to a third track located directly above the machine and leading toward and beyond a container discharging position above the hopper, manually operated devices for moving containers along the third track into and out of the discharging position, a motor for operating conveyors associated with the other tracks for moving containers along them, a switch for the motor and a switch closing device operated by the movement of said manually operated devices for starting the motor to set the conveyors into motion.

2. Apparatus as claimed in claim 1 comprising an abutment on a part moving in timed relationship with said conveyors and adapted to trip the switch to stop the motor when the conveyor movement is completed.

3. Apparatus as claimed in claim 1 wherein a detector is provided on the second track and adapted to be engaged by a passing container to cause a stop to be interposed in the path leading from the first track to the second track said stop being removed from said path when the first said container has passed by the detector.

GEORGE DEARSLEY.

REFERENCES CITED

The following references are of record in the file of this patent:

UNITED STATES PATENTS

| Number | Name | Date |
| --- | --- | --- |
| 2,204,162 | Smith et al. | June 11, 1940 |
| 2,254,290 | Joa | Sept. 2, 1941 |
| 2,353,638 | Beaulieu et al. | July 18, 1944 |
| 2,421,365 | Patrick | May 27, 1947 |